United States Patent [19]

Slack et al.

[11] Patent Number: 5,693,864
[45] Date of Patent: Dec. 2, 1997

[54] NEW PROCESS FOR THE PRODUCTION OF SECONDARY AMINE TERMINATED POLYETHERS

[75] Inventors: William E. Slack, Moundsville; Rick L. Adkins, New Martinsville, both of W. Va.; Hans Georg Schmelzer, Pittsburgh, Pa.

[73] Assignee: Bayer Corporation, Pittsburgh, Pa.

[21] Appl. No.: 957,929

[22] Filed: Oct. 7, 1992

[51] Int. Cl.$^6$ .................................. C07C 209/08
[52] U.S. Cl. .................. 564/474; 564/504; 564/445; 564/399; 564/462
[58] Field of Search ................... 564/504, 474, 564/445, 399, 462

[56] References Cited

U.S. PATENT DOCUMENTS

| | | | |
|---|---|---|---|
| 2,302,388 | 8/1942 | Hester et al. | 564/504 X |
| 3,654,370 | 4/1972 | Yeakey | 260/584 A |
| 3,666,726 | 5/1972 | Grogler et al. | 260/77.5 CH |
| 3,691,112 | 9/1972 | Grogler et al. | 260/2.5 AM |
| 4,902,768 | 2/1990 | Gerkin et al. | 528/68 |
| 5,015,774 | 5/1991 | Suekane et al. | 564/475 |
| 5,043,472 | 8/1991 | Mafoti | 560/358 |

*Primary Examiner*—Brian M. Burn
*Attorney, Agent, or Firm*—Joseph C. Gil; Godfried R. Akorli; Lyndanne M. Whalen

[57] ABSTRACT

Disclosed herein is a process for preparing an amine terminated polyether comprising reacting a polyether containing a leaving group with a primary amine or ammonia at a temperature of about 70 to 250 degrees Centigrade.

4 Claims, No Drawings

NEW PROCESS FOR THE PRODUCTION OF SECONDARY AMINE TERMINATED POLYETHERS

BACKGROUND OF THE INVENTION

1. Field of Invention

The present invention relates to a process for preparing a new class of amine-terminated polyethers (ATPEs) having a low viscosity and a good reactivity. Said ATPEs are particularly suitable for use in automotive polyurea-based reaction injection molding (RIM) systems.

2. Brief Description of the Prior Art

Amine terminated polyethers and various processes for preparing the same are known in the art. Given the recent success of RIM systems based on the amine-terminated polyethers, there is a considerable interest in improving on these polyethers and the processes for preparing the same. Of particular interest here are amine-terminated polyethers which have desirably fast reactivity and are at the same time processable.

U.S. Pat. No. 3,654,370 discloses amine-terminated polyethers which are prepared by reacting polyols with ammonia under catalyzed high temperature reaction conditions.

U.S. Pat. Nos. 3,666,726, 3,691,112, 5,043,472 disclose amine-terminated polyethers which are prepared by reacting a polyfunctional acetoacetic acid ester with a polyfunctional amine.

U.S. Pat. No. 4,902,768 discloses N-(polyoxyalkyl)-N-(alkyl)amine by catalytic amination of an appropriate polyol by reacting the polyol with a primary or secondary amine in the presence of a catalyst such as nickel.

U.S. Pat. No. 5,015,774 discloses a process for preparing polyoxyalkylene polyamines having secondary amino groups at the end of the polyamine by reacting polyoxyalkylene polyol with a primary amine in the presence of a catalyst containing nickel and zinc, cobalt and zinc or cobalt, zinc and nickel.

By the present invention, there is provided an efficacious method of preparing amine-terminated polyethers.

SUMMARY OF THE INVENTION

In accordance with the foregoing, the present invention encompasses a process for preparing an amine terminated polyether(ATPE) comprising reacting a polyether containing a leaving group, such as a halide, a sulfonate or the like, with a primary amine or ammonia at a temperature of about 70 to 250 degrees Centigrade. In the present embodiment of the invention a polyether which has a terminal hydroxyl group can be converted into a polyether containing a good leaving group.

A good leaving group is that which can be displaced at the carbon atom by nucleophiles such as nitrogen, oxygen, sulfur, etc. or the anions of these nucleophiles. As would be realized, the rate at which displacement occurs depends on the chemical nature of the leaving group, and the more stable the free entity of the leaving group is the easier the leaving group is displaced. Hence, a good leaving group is that which is effective in producing reaction products in accordance with the invention, as described herein.

Also encompassed by the invention is the amine-terminated polyether prepared by the claimed process. These amine-terminated polyethers are characterized by low viscosity and good reactivity.

DETAILED DESCRIPTION OF THE INVENTION

The amine-terminated polyethers of this invention have a functionality of between 1 and 6, and a molecular weight of from 106 to 6000. They are further characterized in that they have relatively low viscosities ranging from about 50 to 5000 mPa.s, and an equivalent weight based on amine functional group ranging from 50 to 2500.

As set forth above, the amine-terminated polyethers are prepared by reacting a polyether containing a terminal leaving group with a primary amine or ammonia, at a temperature of about 70 to 250 degrees Centigrade, optionally in the presence of an acid scavenger, such as a tertiary amine or an inorganic base such as sodium hydroxide. The polyether which is terminated with a leaving group can be obtained by converting a hydroxyl group of a polyether polyol to a suitable leaving group. Examples of the leaving groups can be halides, sulfonates, nitrophenoxy and the like. In preparing a polyether containing a leaving group, for example a polyether containing a halide such as a chloride leaving group, a polyether polyol is reacted with a halogenation reagent, e.g., carbonyl chloride. In the instance of carbonyl chloride, the resulting chloroformate rearranges either thermally or in the presence of a tertiary amine or amide catalyst to form a polyether alkyl chloride. Alternatively, carbonyl chloride can be added to a solution of the polyol in N,N-dimethylformamide to form the chloride directly. Other halogenation reagents that can be reacted with a polyether polyol can be thionyl chloride, methanesulfonyl chloride in DMF or triphenyl phosphine in carbon tetrachloride.

Illustrative but non-limiting examples of the polyethers containing hydroxyl groups suitable for use in accordance with the invention can be obtained by the polymerization of alkylene oxides such as ethylene oxide, propylene oxide, butylene oxide, tetrahydrofuran, styrene oxide or epichlorohydrin on their own, for example in the presence boron trifloride, or by the addition of these epoxides, optionally in admixture or successively onto starter components containing reactive hydrogen atoms, such as water, alcohols or amines, for example ethylene glycol, 1,3- or 1,2-propylene glycol, trimethylol propane, 4,4'-dihydroxydiphenyl propane, aniline, ammonia, ethanolamine or ethylene diamine or a mixture thereof.

Non-limiting examples of the tertiary amine catalyst can be pyridine, triethylamine, tributyl amine; non-limiting example of the amide can be N,N-dimethylformamide or N,N-dibutylformamide.

Solvents such as methylene chloride, toluene, chlorobenzene or tetrahydrofuran can be employed in the above methods of preparing the polyether with a leaving group.

In preparing the polyether alkyl halide, a polyether polyol can be reacted with a halogenating agent such as carbonyl chloride at a temperature typically ranging from 0 to 40 degrees Centigrade over a period of 2 to 8 hours. The resultant chloroformate rearranges at temperature ranging from 75 to 150 and preferably 100 to 120 degrees Centigrade, in the presence of a tertiary amine or amide to produce polyether alkyl halides.

In preparing the polyether sulfonate, a polyether polyol can be reacted with methanesulfonyl chloride typically in the presence of a tertiary amine or amide. The reaction can be conducted at a temperature in the range of −30 to 40 degrees Centigrade.

Primary monoamines are reacted with the polyether containing a leaving group over a temperature range of 70 to 250 degrees Centigrade to produce the amine-terminated polyethers of the invention. The amine useful herein include ammonia, aliphatic or aromatic mono and diamines having between 1 and 18 carbons. These amines can be used alone or in combination. Non-limiting examples of amines can be selected from the group consisting of butylamine, aniline, cyclohexylamine, 2-ethylhexylamine and a mixture thereof. The ratio of moles of amine to equivalents of leaving group of the polyether is between the ratio of 12 to 1 and 1 to 1, preferably 3 to 1.

Sodium bicarbonate or sodium hydroxide can be employed as an acid scavenger in the amine displacement reaction. It is believed that the polyether leaving group undergoes a displacement reaction to give secondary amines. If desired any good solvent such as methylene chloride, toluene, chlorobenzene, or tetrahyfrofuran (THF) can be used in any of the foregoing reactions.

The resultant amine-terminated polyethers are obtained in high yields (greater that 90%) with relatively low viscosities of from 50 mPa.s for 100 equivalent weight difunctional amine-terminated polyether to 2000 mPa.s for a 2000 equivalent weight trifunctional amine-terminated polyether.

This and other aspects of the invention are further described by the following non-limiting examples.

EXAMPLES

Polyols

In the examples which follow, these materials were used:

Polyol A: a glycerine/propylene oxide/ethylene oxide adduct, with the ethylene oxide being present as a 17% by weight termination, having a 4800 molecular weight.

Polyol B: a polytetrahydrofuran ether diol having a 1000 molecular weight.

Polyol C: a propylene glycol/propylene oxide adduct having a 2000 molecular weight.

Polyol D: tripropylene glycol.

Polyol E: a trimethylolpropane/propylene oxide adduct having a 455 molecular weight.

Polyol F: a propylene glycol/propylene oxide/ethylene oxide adduct, with the ethylene oxide being present as a 17% by weight termination, having a 2000 molecular weight.

Polyol G: a glycerine/propylene oxide/ethylene oxide adduct, with the ethylene oxide being present as a 17% by weight termination, having a 3000 molecular weight.

Chloroformate Preparation

Polyol A (3.0 eq) was added to a 5 L 3-necked flask fitted with a stirrer and dry ice/acetone condenser. Phosgene (3.75 moles) was added at 1.5 mol/h, keeping the reaction temperature below 35° C. After the phosgene addition was complete, the reaction mixture was stirred at room temperature for an additional 2 hours. The chloroformate was purged with $N_2$ at 40° C. to remove residual phosgene. Titration of Chloroformate A showed 100% conversion. All chloroformates listed in Table I were made using this procedure.

| Chloroformate | Polyol Precursor |
| --- | --- |
| A | A |
| B | B |
| C | C |
| D | D |
| E | E |
| F | F |
| G | G |

Mesylate Preparation

Polyol A (0.312 eq), triethylamine (0.350 mol), and 60 mL $CH_2Cl_2$ were added to a 2 L 3-necked flask fitted with a stirrer and reflux condenser (under nitrogen). Methane sulfonyl chloride (0.350 mol) was added dropwise, keeping the solution temperature at 25° C. with an ice water bath. The reaction solution was stirred at room temperature for 0.5 h, then neutralized with NaOH (0.350 mol). Triethylamine, solvent, and water were vacuum stripped and the product filtered to give a clear, colorless liquid (Mesylate A). All mesylates listed in Table II were made using this procedure.

TABLE II

List of Mesylates Studied

| Mesylate | Polyol Precursor |
| --- | --- |
| A | A |
| B | B |
| C | C |
| D | D |
| E | E |
| F | F |
| G | G |

Example 1

Chloroformate A (2.48 eq) was added to a 12 L 3-necked flask fitted with a stirrer and reflux condenser. The flask was purged with nitrogen and the chloroformate was heated to 55° C. Pyridine (2.48 mol) was added slowly, keeping the reaction temperature at 55° C. The reaction solution was then heated at 100 for 0.5 h, after which the pyridine was vacuum stripped. Aniline (15.1 eq) and $NaHCO_3$ (2.48 eq) were added and the solution was heated at 180° C. For 1.5 h. Excess aniline was removed by vacuum distillation. The product was cooled and filtered to give a clear, black liquid with a viscosity of 1920 mPa.s and an amine number of 30.2. The conversion was 90.3% based on the amine number. (See Table III)

Example 2

Chloroformate A (2.20 eq) was added to a 12 L 3-necked flask fitted with a stirrer and reflux condenser. The flask was purged with nitrogen and the chloroformate was heated to 60° C. N,N-Dimethylformamide (4.40 mol) was added, keeping the reaction temperature at 60° C. The reaction solution was then heated at 100° C. for 1 h, after which the DMF was vacuum stripped. Octylamine (13.17 mol) was added and the solution was heated at 190° C. for 17 h. The solution was cooled and neutralized with NaOH (2.20 mol). Excess octylamine was vacuum stripped and the product filtered to give a clear, light yellow liquid with a viscosity of 782 mPa.s and an amine number of 29.6. The conversion was 90.4% based on the amine number. (See Table III)

Example 3

Chloroformate B (0.58 eq) was added to a 2 L 3-necked flask fitted with a stirrer and reflux condenser. The flask was purged with nitrogen and the chloroformate was heated to 60° C. N,N-Dimethylformamide (1.16 mol) was added, keeping the reaction temperature at 60° C. The reaction solution was then heated at 100° C. for 0.75 h, after which the DMF was vacuum stripped. 2-Ethylhexylamine (3.47 mol) was added and the solution was heated at 180 for 4.5 h. The solution was cooled and neutralized with NaOH (0.58 mol). Excess amine and water were vacuum stripped and the product filtered to give a clear, light yellow liquid with a viscosity of 370 mPa.s and an amine number of 89.0. The conversion was 96.9% based on the amine number. (See Table III)

Examples 4, 6–9

These examples were run using conditions identical with Example 3, keeping moles/equivalents ratios constant.

Example 5

Example 5 was run using conditions identical with Example 1, keeping moles/equivalents ratios constant.

Example 10

Mesylate A (0.0594 eq) was added to a 500 mL 3-necked flask fitted with a stirrer and reflux condenser (under nitrogen). Cyclohexylamine (0.178 mol) was added and the solution was heated at 150° C. for 2 h. The solution was cooled and neutralized with NaOH (0.060 mol). Excess amine and water were vacuum stripped and the product filtered to give a clear, light yellow liquid with a viscosity of 1250 mPa.s and an amine number of 31.4. The conversion was 94.2% based on the amine number. (See Table IV)

Examples 11–16

These examples were run using conditions identical with Example 10, keeping moles/equivalents ratios constant.

TABLE III

Secondary ATPE Formation Via Chloroformate Rearrangement

| | | | | Amine Displacement Reaction | | | | |
|---|---|---|---|---|---|---|---|---|
| Example | Chloroformate | Catalyst | Amine | Temp. Deg. C. | Time hr. | Amine # | % Amine | Viscosity mPa · s, 25° C. |
| 1 | A | Pyridine | Aniline | 180 | 1.5 | 30.2 | 90.3 | 1920 |
| 2 | A | DMF | 1-Octylamine | 190 | 17.0 | 29.6 | 90.4 | 782 |
| 3 | B | DMF | 2-Ethylhexyl-amine | 180 | 4.5 | 89.0 | 96.9 | 370 |
| 4 | A | DMF | 1,5-Diamino-2-methylpentane | 180 | 2.0 | 53.8 | 81.5 | 1500 |
| 5 | D | Pyridine | Aniline | 180 | 5.0 | 288.0 | 87.9 | 2880 |
| 6 | E | DMF | Aniline | 180 | 5.0 | 210.3 | 85.0 | 4520 |
| 7 | E | DMF | 2-Ethylhexyl-amine | 180 | 20.0 | 187.0 | 87.6 | 84 |
| 8 | F | DMF | 2-Ethylhexyl-amine | 180 | 20.0 | 46.9 | 93.1 | 380 |
| 9 | G | DMF | 2-Ethylhexyl-amine | 170 | 16.0 | 42.2 | 83.6 | 300 |

TABLE IV

Secondary ATPE Formation Via Mesylate Displacement

| | | | Amine Displacement Reaction | | | | |
|---|---|---|---|---|---|---|---|
| Example | Mesylate | Amine | Temp deg °C. | Time hr | Amine # | % Amine | Viscosity mPa · s, 25° C. |
| 10 | A | Cyclohexylamine | 150 | 2.0 | 31.4 | 94.2 | 1250 |
| 11 | A | Cyclohexylamine | 100 | 4.0 | 28.7 | 86.1 | 1300 |
| 12 | A | 1-Butylamine | 100 | 3.0 | 28.7 | 84.8 | 910 |
| 13 | A | 2-Ethylhexylamine | 150 | 2.0 | 29.4 | 89.8 | 994 |
| 14 | C | Cyclohexylamine | 150 | 6.0 | 45.8 | 88.4 | 300 |
| 15 | C | 2-Ethylhexylamine | 150 | 4.0 | 44.0 | 87.3 | 320 |
| 16 | D | 2-Ethylhexylamine | 100 | 5.0 | 257.0 | 95.0 | 50 |

What is claimed is:

1. A process for preparing a secondary amine terminated polyether having an amine functionality of 2 to 6 comprising reacting a polyether containing 2 to 6 leaving groups with a primary amine or ammonia at a temperature of about 70 to 250 degrees Centigrade.

2. The process of claim 1 wherein the leaving group is selected from the group consisting of a halide, a sulfonate, and a nitrophenoxy group.

3. The process of claim 1 wherein the primary amine is selected from the group consisting of an aromatic amine, an aliphatic amine, a cycloaliphatic amine and a mixture thereof.

4. The process of claim 3 wherein the primary amine is selected from the group consisting of 2-ethylhexylamine, cyclohexylamine, butylamine and aniline.

* * * * *